(12) United States Patent
Veedu

(10) Patent No.: US 7,713,448 B1
(45) Date of Patent: May 11, 2010

(54) CARBON NANOMATERIAL DISPERSION AND STABILIZATION

(75) Inventor: Vinod P. Veedu, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 127 days.

(21) Appl. No.: 11/904,247

(22) Filed: Sep. 25, 2007

Related U.S. Application Data

(60) Provisional application No. 60/965,576, filed on Aug. 21, 2007.

(51) Int. Cl.
*H01B 1/24* (2006.01)

(52) U.S. Cl. ............... 252/506; 252/510; 252/511; 252/502; 501/90; 501/99; 106/717; 106/814

(58) Field of Classification Search .......... 252/506, 252/510, 511, 502; 501/90, 99; 106/717, 106/814
See application file for complete search history.

(56) References Cited

U.S. PATENT DOCUMENTS

| | | | | |
|---|---|---|---|---|
| 6,911,260 | B2 * | 6/2005 | Ren et al. ............. | 428/408 |
| 2003/0004058 | A1 * | 1/2003 | Li et al. ............. | 502/258 |
| 2004/0234566 | A1 * | 11/2004 | Qiu et al. ............. | 424/401 |
| 2006/0029537 | A1 * | 2/2006 | Zhang et al. ............. | 423/447.1 |
| 2006/0039848 | A1 * | 2/2006 | Matarredona et al. ..... | 423/447.1 |
| 2006/0159916 | A1 * | 7/2006 | Dubrow et al. ............. | 428/357 |
| 2007/0077432 | A1 * | 4/2007 | Nagasaki et al. ............ | 428/407 |
| 2007/0128960 | A1 * | 6/2007 | Ghasemi Nejhad et al. ... | 442/59 |
| 2007/0142548 | A1 * | 6/2007 | Nejhad et al. ............. | 524/847 |
| 2007/0298168 | A1 * | 12/2007 | Ajayan et al. ............. | 427/249.1 |
| 2008/0277652 | A1 * | 11/2008 | Mochizuki et al. ............. | 257/40 |
| 2009/0039308 | A1 * | 2/2009 | Gounko et al. ............. | 252/62.54 |
| 2009/0142581 | A1 * | 6/2009 | Heintz et al. ............. | 428/323 |

FOREIGN PATENT DOCUMENTS

WO WO2007010517 * 7/2006

OTHER PUBLICATIONS

Nanotube Sandwiches Could Lead to Better Composite Materials, RPI News and Events, May 8, 2006, pp. 1-3.*
Hierarchical Manufacture and Characterization of Multifunctional Nanocomposite Structures, Vinod P.V. Veedu, PhD Dissertation, University of Hawaii, Dec. 2006, 114 pages.*
Veedu et al., Multifunctional composites using reinforced laminae with carbon-nanotube forests, Nature Materials, 5 (Jun. 2006), 457-462.*

* cited by examiner

*Primary Examiner*—Douglas McGinty
(74) *Attorney, Agent, or Firm*—James Creighton Wray; Meera P. Narasimhan

(57) ABSTRACT

Carbon nanomaterials are stabilized and uniformly dispersed in a liquid such as water using a simple procedure. Methylcellulose is added to hot water where it separates and expands with a temperature of about 80-90 degree Celsius. Methylcellulose swiftly dissolves when the water cools down. Carbon nanomaterials are dispersed in a solvent and sonicated. This nanomaterial dispersed solvent is then added to the methylcellulose dispersed water and mechanically stirred. The resulting uniform mixture is up to 90% by weight nanomaterials and is stable for months.

14 Claims, 3 Drawing Sheets

CARBON NANOMATERIAL DISPERSION AND STABILIZATION

This application claims the benefit of U.S. Provisional Application No. 60/965,576 filed Aug. 21, 2007, which is hereby incorporated by reference in its entirety.

FIELD OF THE INVENTION

This invention applies to carbon derived nanomaterials such as carbon nanotubes and graphene, which have a variety of applications, such as in combination with existing materials as structural materials, in bio-medical applications, electronics, optics, paint, adhesive, and coating materials.

BACKGROUND OF THE INVENTION

Recent developments in nanotechnology promise that incorporating nanomaterials, such as carbon nanotubes (CNTs), at a very low loading percentage will enhance the overall performance of structural materials many-fold. Carbon nanotubes are quasi-one dimensional, nearly single crystalline (axially), hollow, graphitic carbon structures. The combination of high aspect ratio, small size, excellent mechanical properties, low density, and high electrical conductivity make them perfect candidates as fillers in polymer composites. Experimental as well as theoretical predictions regarding nanotubes suggest an axial Young's modulus of 1 TPa.

These exciting properties make carbon nanotubes greatly desired carbonaceous materials that have a wide range of applications for their extraordinary physical, chemical, and mechanical properties. However, difficulties in dispersing carbon nanotubes and their tendency to aggregate in aqueous environments prevent them from being used in many applications. As prepared nanotubes are insoluble in many liquids, such as water and polymers. A good dispersion of the materials, preferably up to single nanotube level, is of critical importance in achieving the predicted exciting properties for nanotube reinforced materials.

Needs exist for improved methods of dispersing and stabilizing carbon nanomaterials without significantly degrading their physical and chemical characteristics.

SUMMARY OF THE INVENTION

This invention demonstrates a revolutionary but simple method for the effective and uniform dispersion of carbon nanotubes in water. In the present invention, carbon nanotubes are stabilized and uniformly dispersed in water without significant degradation of their characteristics and without the complex procedures of other proposed approaches. The carbon nanotubes may be single walled, multiple walled, as prepared, purified or functionalized. In fact, the same approach may be used for the dispersion of any type of nanomaterials, such as nanoparticles, buckyballs, nanoclays etc. This method can also be used to disperse nanomaterials in a matrix material, such as a matrix material derived from a metal, ceramic, or polymer, or a combination thereof, instead of water.

The invention can be used to disperse nanomaterials in fluids and liquids or flowable materials. The dispersion is effective in solvents or water, monomers or polymers, or any flowable material. The dispersion is particularly effective in thixotropic fluids which have a consistency such as partially set gelatin, which in turn can be spread on substrates as coatings before the carrier evaporates or hardens, leaving a coating with reinforcing or conducting nanoparticles, or which can be mixed with other materials and allowed to harden or set, leaving an object reinforces or rendered conductive with internal nanoparticles. Alternatively, the liquid may be left in its liquid form without setting or hardening to supply a uniformly dispersed flowable or bendable mass of nanoparticles in a liquid or semi-liquid.

The nanotube dispersion in water (nano admixture) projects applications in many different areas including structural materials, bio-medical applications, electronics, optics, paint, adhesive and coating materials. For example, the nano admixture can be mixed with the water used in the manufacture of concrete to produce a multifunctional nanocomposite smart material with significantly improved physical and chemical properties compared to unmodified concrete. In fact the invention is applicable to any application that requires water stabilized carbon nanotubes.

A new nanomaterial dispersion and stabilization method disperses nanomaterials in a solvent and sonicates the solvent with dispersed nanomaterials. Separately, a hydrophilic emulsifier, thickener, additive or cellulose derived compound is added to hot water. The hydrophilic emulsifier, thickener, additive or cellulose derived compound is separated and expanded in the water. The hydrophilic emulsifier, thickener, additive or cellulose derived compound is then dissolved in the water. The sonicated solvent and dispersed nanomaterials are added to the water with the dissolved hydrophilic emulsifier, thickener, additive or cellulose derived compound, and the combination is mechanically stirred, uniformly dispersing the nanomaterials throughout the water with the dissolved hydrophilic emulsifier, thickener, additive or cellulose derived compound.

The nanomaterials may comprise carbon nanotubes, which may be single walled, multiple walled, as prepared, purified or functionalized. The nanomaterials may comprise nanoparticles, buckyballs, or nanoclays. The solvent may comprise acetone or alcohol. The hydrophilic emulsifier, thickener, additive or cellulose derived compound may comprise methylcellulose. The combination remains uniform and stable for over two months. The amount of nanomaterials in the dispersion ranges from 0.00001-90% by weight. The water may be 80 to 90 degrees when separating and expanding the hydrophilic emulsifier, thickener, additive or cellulose derived compound in the water. The dissolving the hydrophilic emulsifier, thickener, additive or cellulose derived compound in the water may, comprise cooling the water.

A new nanomaterial dispersion and stabilization method consists essentially of the following steps: 1) nanomaterials are dispersed in a solvent, 2) the solvent with dispersed nanomaterials is sonicated, 3) separately a hydrophilic emulsifier, thickener, additive or cellulose derived compound is added to hot water, 4) the hydrophilic emulsifier, thickener, additive or cellulose derived compound is separated and expanded in the water, 5) the hydrophilic emulsifier, thickener, additive or cellulose derived compound is dissolved in the water, 6) the sonicated solvent and dispersed nanomaterials are added to the water with the dissolved hydrophilic emulsifier, thickener, additive or cellulose derived compound, and 7) the combination of solvent with dispersed nanomaterials and water with the dissolved hydrophilic emulsifier, thickener, additive or cellulose derived compound is mechanically stirred, and the nanomaterials are uniformly dispersed throughout the water with the dissolved hydrophilic emulsifier, thickener, additive or cellulose derived compound.

A new nanomaterial dispersion and stabilization method comprises dispersing nanomaterials in a solvent and sonicating the solvent with dispersed nanomaterials. Separately, an emulsifier, thickener, additive or cellulose derived compound is added to a hot matrix material. The emulsifier, thickener, additive or cellulose derived compound is separated and expanded in the matrix material. The emulsifier, thickener, additive or cellulose derived compound is then dissolved in the matrix material. The sonicated solvent and dispersed nanomaterials are added to the matrix material with the dissolved hydrophilic emulsifier, thickener, additive or cellulose derived compound. The combination of solvent with dispersed nanomaterials and matrix material with the dissolved hydrophilic emulsifier, thickener, additive or cellulose derived compound is mechanically stirred, and the nanomaterials are uniformly dispersed throughout the matrix material with the dissolved hydrophilic emulsifier, thickener, additive or cellulose derived compound.

The matrix material may be derived from a material selected from the group consisting of metals, ceramics, polymers, and combinations thereof. The dissolving the emulsifier, thickener, additive or cellulose derived compound in the matrix material may comprise cooling the matrix material.

These and further and other objects and features of the invention are apparent in the disclosure, which includes the above and ongoing written specification, with the drawings.

DETAILED DESCRIPTION OF THE INVENTION

Figure 1:
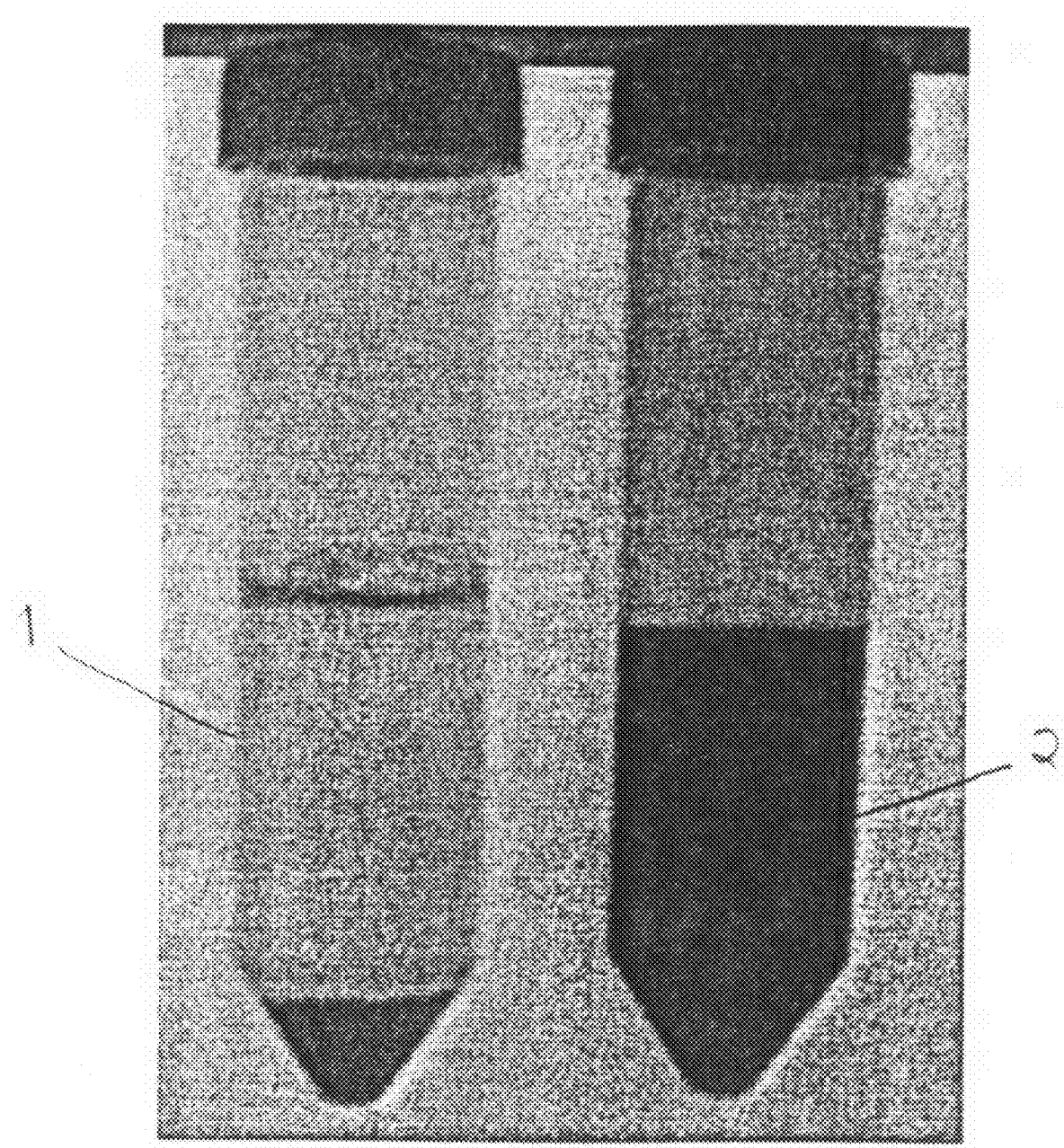
FIG. 1 is a photograph showing the dispersion of carbon nanotubes in water without the invention on the left and with the invention on the right.

FIG. 1 is a photograph showing the dispersion of carbon nanotubes in water. On the left is simple nanotube water dispersion 1. Near-complete separation and precipitation of the nanotubes has occurred within ten to fifteen minutes. On the right is nanotube dispersion in water 2 created using the method of the present invention after two months have passed. The nanotube dispersion in water 2 is stable even months after preparation.

Figure 2:
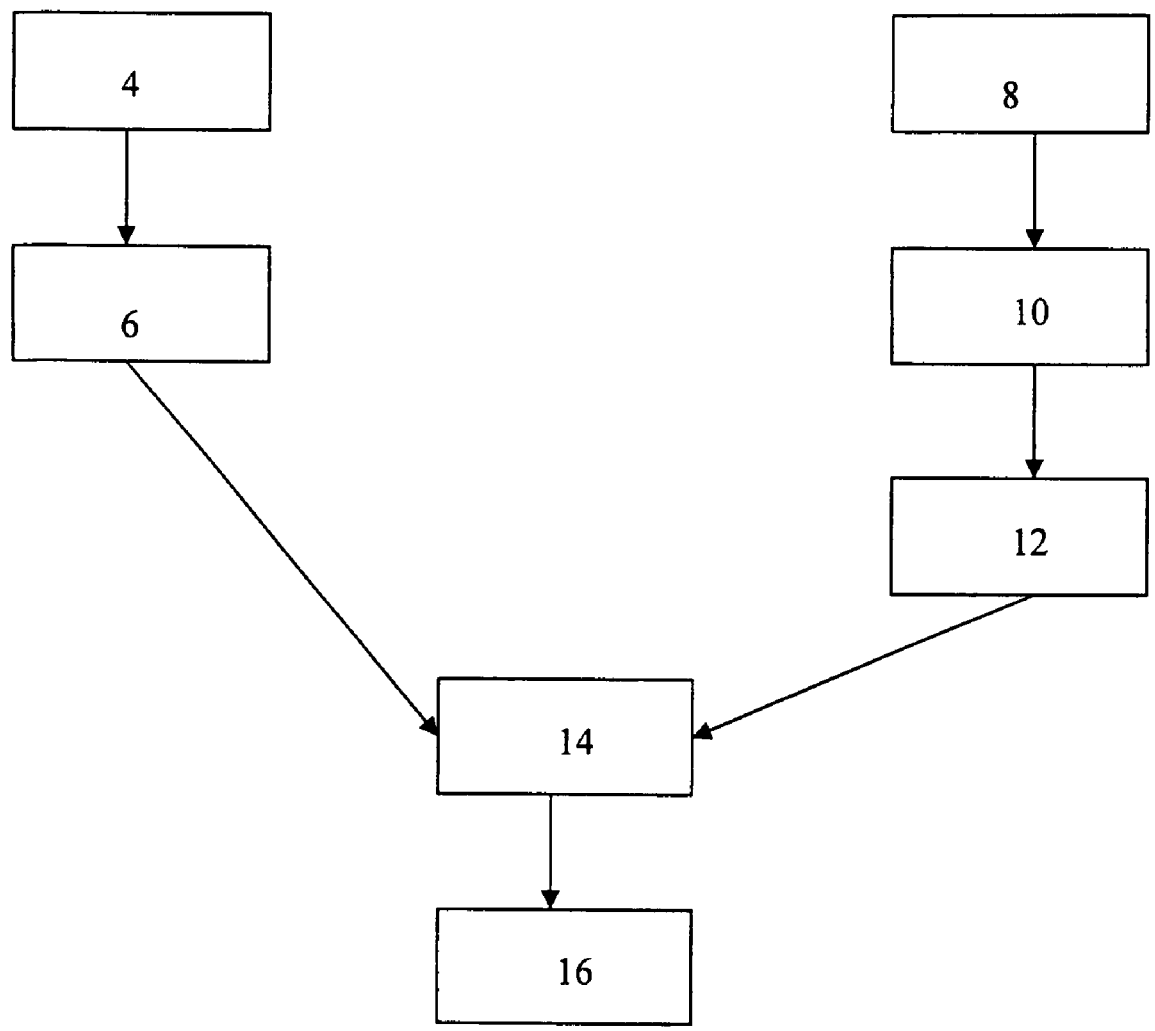
FIG. 2 is a diagram illustrating a method of dispersing nanomaterials in water.

FIG. 2 is a diagram illustrating a method of dispersing nanomaterials in water according to the present invention. In one example, to properly disperse carbon nanotubes in water, methylcellulose, or any hydrophilic emulsifier, thickener, additive or cellulose derived compound, is added to hot water 8 where it separates and expands 10 with a temperature of about 80-90 degree Celsius. Methylcellulose swiftly dissolves 12 when the water cools down. The resulting mixture is stable.

Prior to this process, carbon nanotubes were dispersed in a solvent 4, preferably acetone or an alcohol such as ethanol, and sonicated 6. This nanotube dispersed solvent is then added to the methylcellulose dispersed water 14 and mechanically stirred 16. The resulting mixture was observed for more than two months and seemed to be uniform and stable as shown in FIG. 1. The amount of nanotubes in the dispersion may vary from 0.00001-90% by weight. Also, the size and loading fraction of the nanotubes may be varied.

Figure 3:
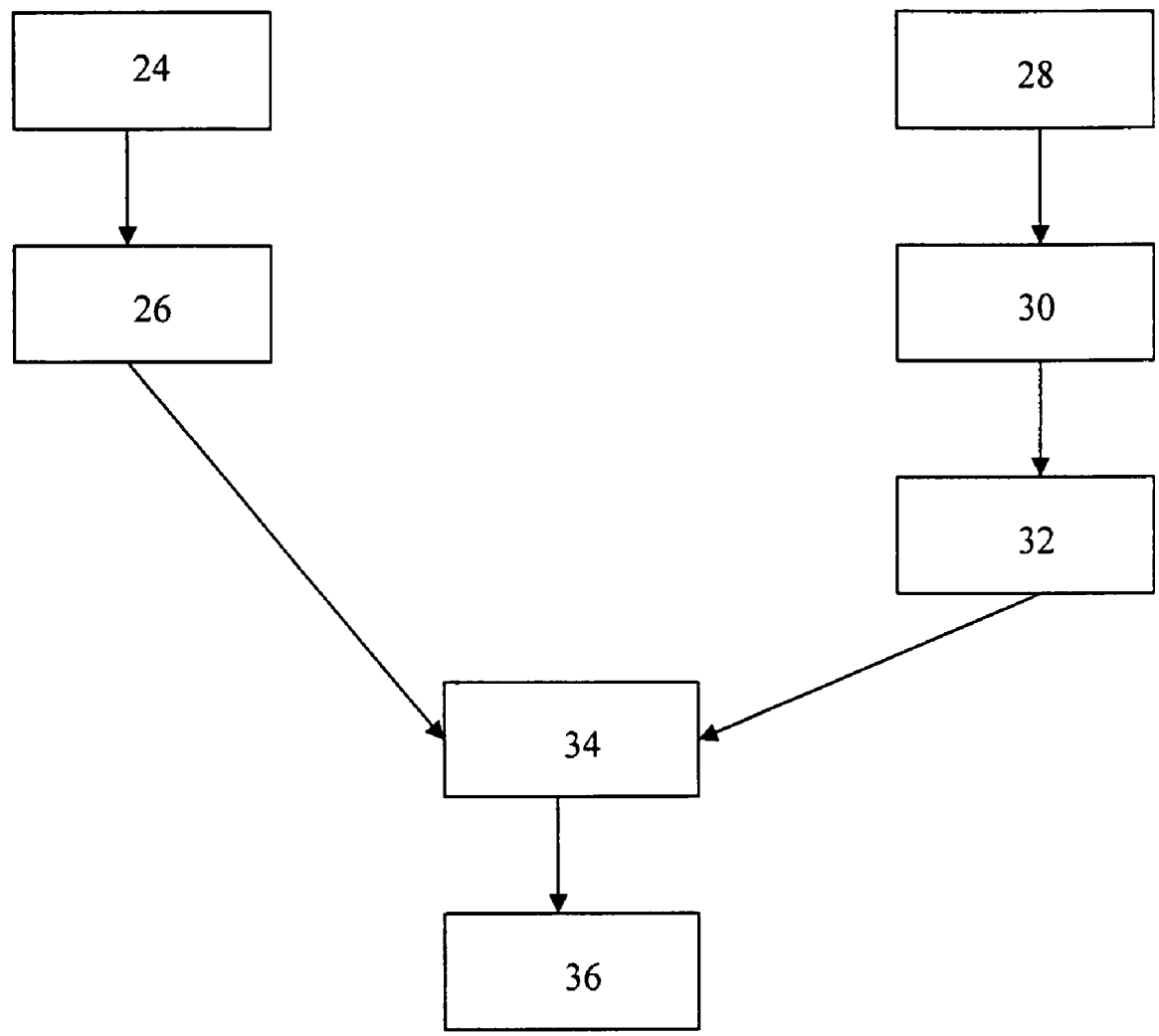
FIG. 3 is a diagram illustrating a method of dispersing nanomaterials in a matrix material.

FIG. 3 is a diagram illustrating a method of dispersing nanomaterials in a matrix material according to the present invention. Nanomaterials are dispersed in a solvent 24, and the solvent with dispersed nanomaterials is then sonicated 26. Separately, an emulsifier, thickener, additive or cellulose derived compound is added to a hot matrix material 28. The emulsifier, thickener, additive or cellulose derived compound is separated and expanded in the matrix material 30. The emulsifier, thickener, additive or cellulose derived compound is then dissolved in the matrix material 32. The sonicated solvent and dispersed nanomaterials are added to the matrix material with the dissolved hydrophilic emulsifier, thickener, additive or cellulose derived compound 34. The resulting combination of solvent with dispersed nanomaterials and matrix material with the dissolved hydrophilic emulsifier, thickener, additive or cellulose derived compound is mechanically stirred 36, and the nanomaterials are uniformly dispersed throughout the matrix material with the dissolved hydrophilic emulsifier, thickener, additive or cellulose derived compound.

The dispersion in water may be used to add and mix in other vehicles and materials such as coatings or substrates, multiple part objects of varied content and uniform solid objects.

While the invention has been described with reference to specific embodiments, modifications and variations of the invention may be constructed without departing from the scope of the invention.

I claim:

1. A nanomaterial dispersion and stabilization method comprising:
   dispersing nanomaterials in a solvent,
   sonicating the solvent with dispersed nanomaterials,
   separately adding a hydrophilic cellulose derived compound to hot water,
   separating and expanding the hydrophilic cellulose derived compound in the water,
   dissolving the hydrophilic cellulose derived compound in the water,
   adding the sonicated solvent and dispersed nanomaterials to the water with the dissolved hydrophilic cellulose derived compound, and
   mechanically stirring the combination of solvent with dispersed nanomaterials and water with the dissolved hydrophilic cellulose derived compound, and uniformly dispersing the nanomaterials throughout the water with the dissolved hydrophilic cellulose derived compound.

2. The method of claim 1, wherein the nanomaterials further comprise carbon nanotubes.

3. The method of claim 2, wherein the carbon nanotubes are single walled, multiple walled, as prepared, purified or functionalized.

4. The method of claim 1, wherein the nanomaterials further comprise nanoparticles, buckyballs, or nanoclays.

5. The method of claim 1, wherein the solvent further comprises acetone or alcohol.

6. The method of claim 1, wherein the hydrophilic cellulose derived compound is methylcellulose.

7. The method of claim 1, wherein the combination remains uniform and stable for over two months.

8. The method of claim 1, wherein the amount of nanomaterials in the dispersion ranges from 0.00001-90% by weight.

9. The method of claim 1, wherein the water is 80 to 90 degrees when separating and expanding the hydrophilic cellulose derived compound in the water.

10. The method of claim 1, wherein the dissolving the hydrophilic cellulose derived compound in the water comprises cooling the water.

11. A nanomaterial dispersion and stabilization method consisting essentially of:
   dispersing nanomaterials in a solvent,
   sonicating the solvent with dispersed nanomaterials, separately adding a hydrophilic cellulose derived compound to hot water, separating and expanding the hydrophilic cellulose derived compound in the water, dissolving the hydrophilic cellulose derived compound in the water, adding the sonicated solvent and dispersed nanomaterials to the water with the dissolved hydrophilic cellulose derived compound, and mechanically stirring the combination of solvent with dispersed nanomaterials and water with the dissolved hydrophilic cellulose derived compound, and uniformly dispersing the nanomaterials throughout the water with the dissolved hydrophilic cellulose derived compound.

12. A nanomaterial dispersion and stabilization method comprising:

dispersing nanomaterials in a solvent, sonicating the solvent with dispersed nanomaterials, separately adding hydrophilic cellulose derived compound to a hot matrix material, separating and expanding the hydrophilic cellulose derived compound in the matrix material, dissolving the hydrophilic cellulose derived compound in the matrix material, adding the sonicated solvent and dispersed nanomaterials to the matrix material with the dissolved hydrophilic cellulose derived compound, and mechanically stirring the combination of solvent with dispersed nanomaterials and matrix material with the dissolved hydrophilic cellulose derived compound, and uniformly dispersing the nanomaterials throughout the matrix material with the dissolved hydrophilic cellulose derived compound.

13. The method of claim 12, wherein the matrix material is derived from a material selected from the group consisting of metals, ceramics, polymers, and combinations thereof.

14. The method of claim 12, wherein the dissolving the hydrophilic cellulose derived compound in the matrix material comprises cooling the matrix material.

* * * * *